United States Patent Office
3,590,021
Patented June 29, 1971

3,590,021
ORGANOSILAZANES
Richard P. Bush, Penarth, Glamorgan, Wales, assignor to Midland Silicones Limited, Reading, Berkshire, England
No Drawing. Filed Nov. 25, 1968, Ser. No. 778,812
Claims priority, application Great Britain, Dec. 6, 1967, 55,485/67
Int. Cl. C08f 11/04
U.S. Cl. 260—46.5E        14 Claims

ABSTRACT OF THE DISCLOSURE

Cyclic organosilazanes of the general formula

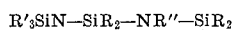

are reacted with hydroxy organic compounds or hydroxysilicon compound (AOH) to produce linear compounds and polymers of the general formula

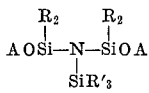

This invention relates to a process for the preparation of nitrogen-containing organosilicon compounds and also relates to novel organosilicon compounds produced thereby.

According to the invention, there is provided a process for the preparation of nitrogen-containing organosilicon compounds which comprises reacting (i) an organic or organosilicon material containing at least one ≡COH and/or ≡SiOH group and (ii) an organosilicon compound of the general formula

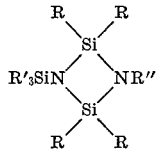

wherein each R and each R′ represents an alkyl radical containing less than 6 carbon atoms, an alkenyl radical containing less than 7 carbon atoms or a monocyclic aryl radical and R″ represents a hydrogen atom or an alkyl radical containing less than 12 carbon atoms.

As the reactant (i), there can be employed in the process of this invention any organic or organosilicon material containing at least one hydroxyl group bonded to silicon (≡SiOH) or at least one hydroxyl group on carbon (≡COH) or both. The organic or organosilicon material can be monomeric or polymeric and can contain one or more than one of the required groups in the molecule. If desired, the reactant (i) can comprise more than one organic or organosilicon material or a mixture of the two types. The specified ≡COH and ≡SiOH groups can also be present in the same reactant.

Examples of the operative monomeric materials (i) are phenols, such as phenol, p-nitrophenol, p-aminophenol, cresol, catechol and resorcinol, compounds containing phenolic groupings, for example, 2,2-bis(4-hydroxyphenyl)propane, monohydric and polyhydric alcohols such as methyl alcohol, isopropyl alcohol, n-butyl alcohol, allyl alcohol, cyclohexanol, benzyl alcohol, ethylene glycol, propylene glycol, tetramethyl ethylene glycol, glycerol, erythritol and mannitol, carboxylic acids such as acetic acid, propionic acid, trifluoroacetic acid, lactic acid, oxalic acid, tartaric acid, benzoic acid, salicyclic acid, isophthalic acid and terephthalic acid, carbohydrates such as arabinose and fructose and silanols such as triphenylsilanol, diphenylsilanediol and methylphenylsilanediol. Examples of polymeric materials which can be reacted with the organosilicon compound (ii) according to the invention are mono- and di-hydroxy terminated polyethers such as polyoxyethylenes, polyoxypropylenes and mixed polyoxyethylenepolyoxypropylene products, polyester and phenolic resins containing residual hydroxyl radicals, hydroxylated siloxanes and hydroxylated polysilarylenes. Organic or organosilicon materials containing two reactive hydroxyl groups per molecule, for example, hydroxy-terminated diorganopolysiloxanes or the compound 2,2-bis(4-hydroxyphenyl)propane are normally preferred because they lend themselves to the formation of well defined linear polymer structures.

The organosilicon compounds which constitute reactant (ii) in the process of the invention are cyclodisilazanes in which one of the nitrogen atoms is attached directly to three silicon atoms. Such compounds can be prepared by reacting a compound of the general formula $$(XR_2Si)_2NSiR'_3$$

wherein X is chlorine, bromine or iodine, with ammonia or an organic amine. For example, the preparation of the cyclodisilazane is conveniently carried out by passing, e.g. ammonia or methylamine, into a solution of the compound $(XR_2Si)_2NSiR'_3$ at or about room temperature. The compound $(XR_2Si)_2NSiR'_3$ can be obtained by halogenation of the corresponding compound wherein X represents a hydrogen atom. This latter compound can, in turn, be obtained by the reaction of $(HR_2Si)_2NZ$, where Z is an alkali metal atom (preferably lithium) with a triorganomonochlorosilane R′$_3$SiCl. Methods for the preparation of the cyclodisilazane and its precursors are described more fully in our co-pending U.S. application Ser. No. 734,243, filed June 4, 1968.

The organic radicals R and R′ in the cyclodisilazane may be the same or different and may be alkyl radicals containing less than 6 carbon atoms, for example, methyl, ethyl, propyl or butyl radicals, alkenyl radicals containing less than 7 carbon atoms, for example, vinyl, allyl and cyclohexenyl radicals or a monocyclic aryl radical, for example, the phenyl radical. R″ may be a hydrogen or any alkyl radical containing less than 12 carbon atoms, for example, the methyl, ethyl, octyl or decyl radicals. Preferably, the organic radicals in the cyclodisilazane are selected from methyl and phenyl radicals.

In many cases, reaction between the organic or organosilicon material (i) and the cyclodisilazane (ii) takes place readily when they are brought together at ambient or slightly elevated temperatures. However, higher temperatures may be employed to accelerate the reaction, if desired, provided the decomposition temperature of one or both of the reactants is not attained. The most preferred range of temperatures for performing the reaction is from 10° C. to 80° C. When the reaction product is polymeric, it may be subjected to a further heating step at temperatures up to 180° C. or more to increase its molecular weight.

If desired, solvents can be incorporated into the reaction mixture to compatibilize the components or to assist in the recovery of the reaction products. Any suitable inert organic solvent, for example, benzene, hexane or tetrahydrofuran may be used.

The relative proportions of the reactants (i) and (ii) employed in the process of this invention may vary widely depending on the nature of the reactants themselves and on the nature of the reaction product desired. In general, the reaction is believed to involve one mole of the cyclodisilazane with one or two moles of the organic or organosilicon material (i) to provide a polymeric or monomeric product. When the organic or organosilicon material contains only one of the specified ≡COH or ≡SiOH groupings per molecule, the reaction will involve two molecules of the material, which may be represented as AOH, with one molecule of the cyclodisilazane to yield a compound of the general formula

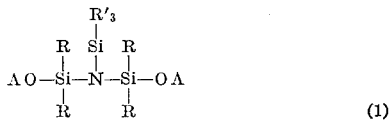

wherein A represents an organic or organosilicon residue which is attached to its adjacent oxygen atom through a C—O or Si—O linkage.

When the organic or organosilicon material contains two hydroxyl radicals per molecule, the reaction product will comprise either a polymer containing the repeating unit

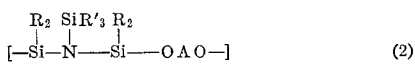

or a cyclic compound of the general formula

A in each case representing the residue derived from the organic or organosilicon material; the formation of the cyclic compound depending on the size and nature of the reactant (i) and the propensity of the final product to cyclize.

The symbol A in the general formulae can represent any monovalent or divalent organic or organosilicon residue derived from the reaction of the hydroxylated organic or organosilicon material with the cyclodisilazane, such residue being attached to its adjacent oxygen atom or atoms through a C—O or Si—O linkage. A can, therefore, represent for example, the phenyl, phenylene, diphenylsilyl, trimethylsilyl or —$CH_2(CF_2)_4CH_2$— radical. As hereinbefore indicated, the preferred organic or organosilicon reactants (i) are 2,2-bis(4-hydroxyphenyl)propane and hydroxyl terminated diorganopolysiloxanes. Preferably, therefore, A represents the residue

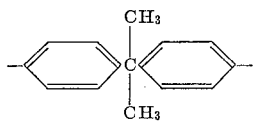

or the residue

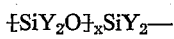

wherein Y represents a monovalent organic radical, for example, a monovalent hydrocarbon or substituted hydrocarbon radical such as the methyl, ethyl, octadecyl, vinyl, phenyl, aminopropyl and trifluoropropyl radicals, and $x$ is zero or an integer.

The organosilicon compounds represented by the general Formulae 1, 2 and 3 are novel and are included within the scope of this invention.

In addition to the preparation of the distinct chemical compounds and polymers defined by the three general formulae above, the process of this invention also finds application in modifying and cross-linking existing organic and organosilicon polymeric materials. For example, the cyclodisilazane may be reacted with organosilicon or organic polymers containing on average more than two hydroxyl radicals to produce a cross-linked resinous or elastomeric product.

The invention is illustrated by the following examples.

EXAMPLE 1

Phenol (4.1 g. dissolved in 5 ml. of dry benzene) was added to 1 - trimethylsilyl-2,2,4,4-tetramethylcyclodisilazane (4.8 g.) contained in a stoppered flask. The addition was performed with both reactants at a temperature of about 25° C. and an immediate exothermic reaction occurred with ammonia gas being evolved. The reaction was followed by gas-liquid chromatography and was observed to be almost complete one hour after addition of the phenol solution.

After being allowed to stand for 4 hours, the reaction mixture was fractionally distilled. The benzene present was removed at atmospheric pressure and the remainder distilled off at reduced pressure to yield bis(phenoxydimethylsilyl)trimethylsilylamine (7.5 g., 88%), B.P. 96°/1.5 mm. Hg.

Nuclear magnetic resonance (N.M.R.) analysis confirmed the structure of the product as

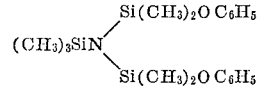

EXAMPLE 2

Resorcinol (2.1 g.) in 5 ml. of dry tetrahydrofuran was added to 4.44 g. of 1-trimethylsilyl-2,2,3,4,4-pentamethylcyclodisilazane at 25° C. An immediate exothermic reaction occurred and methylamine was evolved.

The reaction mixture became viscous after several minutes and the tetrahydrofuran was then removed by distillation. The residue was heated at 150° C. for 24 hours under 1 mm. Hg pressure to accelerate completion of the reaction. A white solid was obtained having a melting point of 130° C. and a molecular weight of approximately 6000. The solid product was a polymer containing the repeating unit

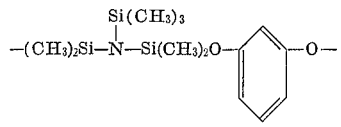

EXAMPLE 3

2,2-bis(4-hydroxyphenyl)propane (5.183 g. dissolved in 15 ml. of dry tetrahydrofuran) was added to the cyclodisilazane compound (4.957 g.) employed in Example 1 contained in a stoppered flask. An exothermic reaction occurred immediately on addition with ammonia gas being evolved.

After about 10 minutes, the solvent was removed under vacuum and the reaction mixture heated to 110° C. and 1 mm. Hg for 100 hours. The resulting product was a hard clear solid of molecular weight 18,500. It was unaffected after being immersed in boiling water for 2 days. Thermogravimetric analysis indicated no significant loss of weight on heating below 355° C. in vacuo or 330° C. in air. The structure of the polymer was confirmed by elemental analysis and infra-red (I.R.) and nuclear magnetic resonance (N.M.R.) spectroscopy.

EXAMPLE 4

Diphenylsilanediol (3.25 g. in 5 ml. of dry tetrahydrofuran) was added at 25° C. to 1-trimethylsilyl-2,2,3,4,4-pentamethylcyclodisilazane (3.5 g.) contained in a stoppered flask. An immediate exothermic reaction took place with methylamine being evolved.

The reaction mixture was refluxed for 24 hours and the tetrahydrofuran removed by distillation under vacuum. The clear liquid remaining was fractionally distilled and yielded a N-silylcyclosiloxazane of the structure

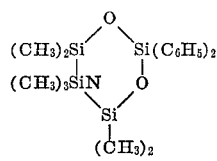

This structure was confirmed by elemental analysis, infrared spectroscopy and nuclear magnetic resonance data.

EXAMPLE 5

The cyclodisilazane (4.982 g.) employed in Example 1 was mixed at 22° C. with a hydroxyl terminated polydimethylsiloxane having an average molecular weight of 1760. Reaction occurred and when the initial reaction had subsided, the mixture was heated to 140° C. under 1 mm. Hg pressure for 140 hours.

The resulting product was a liquid having a molecular weight of 16,500. The liquid was subjected to boiling water under heterogenous conditions for 48 hours and no change in its structure could be detected. A similar result was obtained when the liquid was dissolved in dimethoxyethane and then exposed to boiling water in homogenous solution for 100 hours.

EXAMPLE 6

The cyclodisilazane employed in Example 1 (5.313 g.) was mixed with 2,2,3,3,4,4-hexafluoropentane - 1,5 - diol (5.169 g.) in tetrahydrofuran (10 ml.) at 22° C. A vigorous reaction occurred with evolution of ammonia.

The reaction subsided and the solvent was removed under vacuum. The product was heated for 160 hours at 140° C. and 1 mm. Hg. The resulting product was a viscous, liquid polymer having a molecular weight of 10,000. It was identified by infra-red spectrum and elemental analysis.

That which is claimed is:

1. A process for the preparation of a nitrogen-containing organosilicon compound comprising reacting (i) an organic or organosilicon material containing at least one ≡SiOH or ≡COH or both and selected from the group consisting of phenols, monohydric alcohols, polyhydric alcohols, carboxylic acids, carbohydrates, silanols, monohydroxy- and dihydroxy terminated polyethers, polyester resins containing residual hydroxyl radicals, phenolic resins containing residual hydroxyl radicals, hydroxylated siloxanes and hydroxylated polysilarylenes with (ii) an organosilicon compound of the general formula

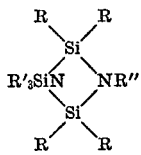

wherein each R and R' represent an alkyl radical containing less than 6 carbon atoms, an alkenyl radical containing less than 7 carbon atoms or a monocyclic aryl radical and R" represents a hydrogen atom or an alkyl radical containing less than 12 carbon atoms.

2. A process as claimed in claim 1 wherein each R and each R' are selected from alkyl radicals containing less than 6 carbon atoms and phenyl radicals.

3. A process as claimed in claim 2 wherein the organic or organosilicon reactant (i) contains two hydroxyl groups per molecule.

4. A process as claimed in claim 1 wherein R and R' each represent the methyl radical.

5. A process as claimed in claim 4 wherein the organic or organosilicon reactant (i) contains two hydroxyl groups per molecule.

6. A process as claimed in claim 1, wherein the organic or organosilicon reactant (i) contains two hydroxyl groups per molecule.

7. A process as claimed in claim 6 wherein the reactant (i) is 2,2-bis(4-hydroxyphenyl)propane or a hydroxyl endblocked diorganopolysiloxane wherein the organic substituents are monovalent hydrocarbon, aminohydrocarbon or halogenohydrocarbon radicals.

8. An organosilicon polymer of the general unit formula

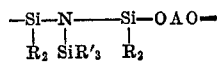

where R and R' are as defined in claim 1 and A is a divalent organic or organosilicon residue attached to each of the oxygen atoms through C—O or Si—O linkage and derived by elimination of two —OH groups from a dihydric phenol, polyhydric alcohol, polycarboxylic acids, organosilanediols and organosilanetriols, dihydroxy terminated polyethers, polyester resins which contain at least two residual hydroxyl radicals per molecule, di- and polyhydroxy phenolic resins, di- and polyhydroxylated siloxanes and di- and polyhydroxylated polysilarylenes.

9. An organosilicon polymer as claimed in claim 8 wherein A represents the divalent residue

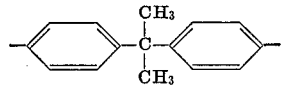

10. An organosilicon compound of the general formula

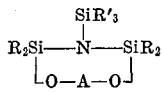

wherein R, R' and A are as defined in claim 8.

11. An organosilicon polymer as claimed in claim 8 wherein A represents the divalent residue

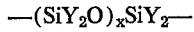

where Y represents a monovalent hydrocarbon, halogenohydrocarbon or aminoalkyl radical of 1 to 18 carbon atoms and $x$ is an integer.

12. An organosilicon polymer as claimed in claim 11 wherein R, R' and Y are each selected from methyl radicals and phenyl radicals.

13. An organosilicone compound of the general formula

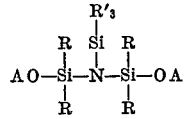

wherein each R and R' represent an alkyl radical containing less than 6 carbon atoms, an alkenyl radical containing less than 7 carbon atoms or a monocyclic aryl radical and A represents a monovalent group obtained by elimination of a hydroxyl radical from a phenol, monohydric alcohol, polyhydric alcohol, carboxylic acid, carbohydrate, organosilanol, monohydroxy and dihydroxy terminated polyethers, polyester resins which contained residual hydroxyl radicals, phenolic resins which contained residual —OH, hydroxylated siloxanes and hydroxylated polysilarylenes.

14. An organosilicon compound as claimed in claim 13, wherein each R and each R' are selected from alkyl radicals containing less than 6 carbon atoms and phenyl radicals.

References Cited

UNITED STATES PATENTS

| | | | |
|---|---|---|---|
| 3,043,798 | 7/1962 | Boyer et al. | 260—46.5 |
| 3,047,527 | 7/1962 | Molotsky et al. | 260—37 |
| 3,253,008 | 5/1966 | Fink | 260—448.2 |
| 3,366,593 | 1/1968 | Breed et al. | 260—33.6 |

DONALD E. CZAJA, Primary Examiner

M. I. MARQUIS, Assistant Examiner

U.S. Cl. X.R.

260—2S, 9R, 47R, 75N, 78.3R, 78.4R, 209R, 448.2N